(12) United States Patent
Reiserer et al.

(10) Patent No.: US 11,745,180 B2
(45) Date of Patent: Sep. 5, 2023

(54) MICROFLUIDIC SYSTEMS, PUMPS, VALVES, FLUIDIC CHIPS THEREOF, AND APPLICATIONS OF SAME

(71) Applicant: VANDERBILT UNIVERSITY, Nashville, TN (US)

(72) Inventors: Ronald S. Reiserer, Nashville, TN (US); David K. Schaffer, Nashville, TN (US); Philip C. Samson, Nashville, TN (US); Dmitry A. Markov, Nashville, TN (US); Michael Geuy, Nashville, TN (US); Lisa J. McCawley, Nashville, TN (US); John P. Wikswo, Brentwood, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 0 days.

(21) Appl. No.: 18/084,634

(22) Filed: Dec. 20, 2022

(65) Prior Publication Data
US 2023/0122594 A1 Apr. 20, 2023

Related U.S. Application Data

(63) Continuation of application No. 17/623,350, filed as application No. PCT/US2020/040061 on Jun. 29, (Continued)

(51) Int. Cl.
*B01L 3/00* (2006.01)
*F04B 43/12* (2006.01)
*F16K 11/16* (2006.01)

(52) U.S. Cl.
CPC . *B01L 3/502738* (2013.01); *B01L 2300/0627* (2013.01); *B01L 2300/123* (2013.01);
(Continued)

(58) Field of Classification Search
CPC ....... B01L 3/502738; B01L 2300/0627; B01L 2300/123; B01L 2400/0644; F04B 43/1261; F16K 11/163
(Continued)

(56) References Cited

U.S. PATENT DOCUMENTS

| | | | | |
|---|---|---|---|---|
| 2,944,529 A | * | 7/1960 | Wiggermann | F04B 1/2042 91/499 |
| 5,149,505 A | * | 9/1992 | English | B01L 3/502 435/287.7 |

(Continued)

*Primary Examiner* — Minh Q Le
(74) *Attorney, Agent, or Firm* — Locke Lord LLP; Tim Tingkang Xia, Esq.

(57) ABSTRACT

Microfluidic systems, pumps, valves and applications of the same are provided. The microfluidic system may be a pump or a valve having a fluidic chip and an actuator controlling the opening and closing of the fluidic channel in the fluidic chip. The actuator may be disposed to tilt from the fluidic chip, forming a tilted-rotor peristaltic pump. Alternatively, the actuator may be a rolling ball actuator, and different fluidic chips may be used in different applications. For example, the fluidic chip may be a spiral pump chip having spiral channels, a rotary peristaltic pump chip having multiple output channels, or a multi-port valve chip having one port interconnected with multiple different ports. An analytical valve chip may switchably interconnect bioreactor and rinse/calibration input channels to sensor and waste output channels. The actuator of a random-access valve can move from one valve position to another without opening or closing intermediate ones.

11 Claims, 9 Drawing Sheets

Related U.S. Application Data 2020, now Pat. No. 11,565,256, which is a continuation-in-part of application No. PCT/US2019/047324, filed on Aug. 20, 2019, and a continuation-in-part of application No. PCT/US2019/047307, filed on Aug. 20, 2019, and a continuation-in-part of application No. PCT/US2019/047190, filed on Aug. 20, 2019.

(60) Provisional application No. 62/868,303, filed on Jun. 28, 2019.

(52) U.S. Cl.
CPC ... *B01L 2400/0644* (2013.01); *F04B 43/1261* (2013.01); *F16K 11/163* (2013.01)

(58) Field of Classification Search
USPC ...... 137/3, 625.15, 625.17, 883, 887, 616.7, 137/827, 828; 422/602, 64, 72, 505, 542
See application file for complete search history.

(56) References Cited

U.S. PATENT DOCUMENTS

| | | | | |
|---|---|---|---|---|
| 5,840,069 | A * | 11/1998 | Robinson | F04B 43/1269 604/153 |
| 6,296,460 | B1 * | 10/2001 | Smith | F04B 43/14 417/475 |
| 10,982,666 | B2 * | 4/2021 | Winking | F04B 43/1261 |
| 2008/0131300 | A1 * | 6/2008 | Junod | F04B 43/14 417/476 |
| 2013/0189120 | A1 * | 7/2013 | Nelson | F04B 43/1261 417/474 |
| 2013/0287613 | A1 * | 10/2013 | Gould | C12M 23/16 417/476 |
| 2014/0154118 | A1 * | 6/2014 | Hendrickson | F04B 43/09 417/474 |
| 2015/0306596 | A1 * | 10/2015 | Thompson | F04B 43/12 422/505 |
| 2015/0308578 | A1 * | 10/2015 | Block, III | C12M 21/08 137/625.48 |
| 2017/0058881 | A1 * | 3/2017 | Sugiura | F04B 43/09 |
| 2017/0096995 | A1 * | 4/2017 | Imai | F04B 43/1261 |
| 2017/0268496 | A1 * | 9/2017 | McIntyre | F04B 43/1261 |
| 2017/0292510 | A1 * | 10/2017 | Bückle | F04B 53/16 |
| 2017/0306944 | A1 * | 10/2017 | Hays | F04B 53/16 |
| 2018/0058438 | A1 * | 3/2018 | Ochoa | F04B 43/1269 |
| 2019/0353158 | A1 * | 11/2019 | Wiederin | F04B 43/1253 |
| 2020/0377241 | A1 * | 12/2020 | Cichy | F04B 13/00 |
| 2021/0239108 | A1 * | 8/2021 | Imai | F04B 11/00 |
| 2021/0404459 | A1 * | 12/2021 | Boyle | F04B 43/1261 |
| 2022/0362769 | A1 * | 11/2022 | Reiserer | B01L 3/50273 |

* cited by examiner

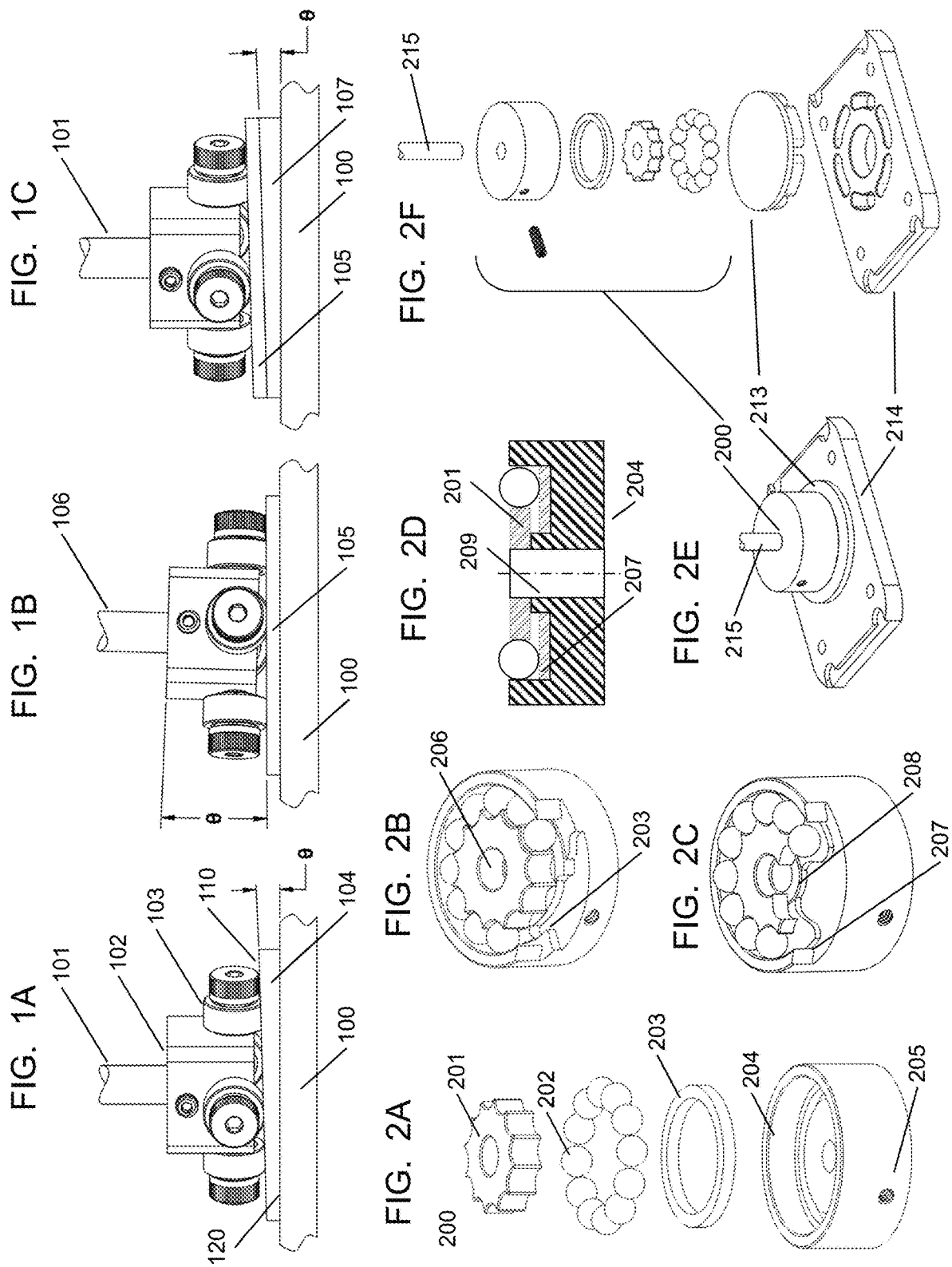

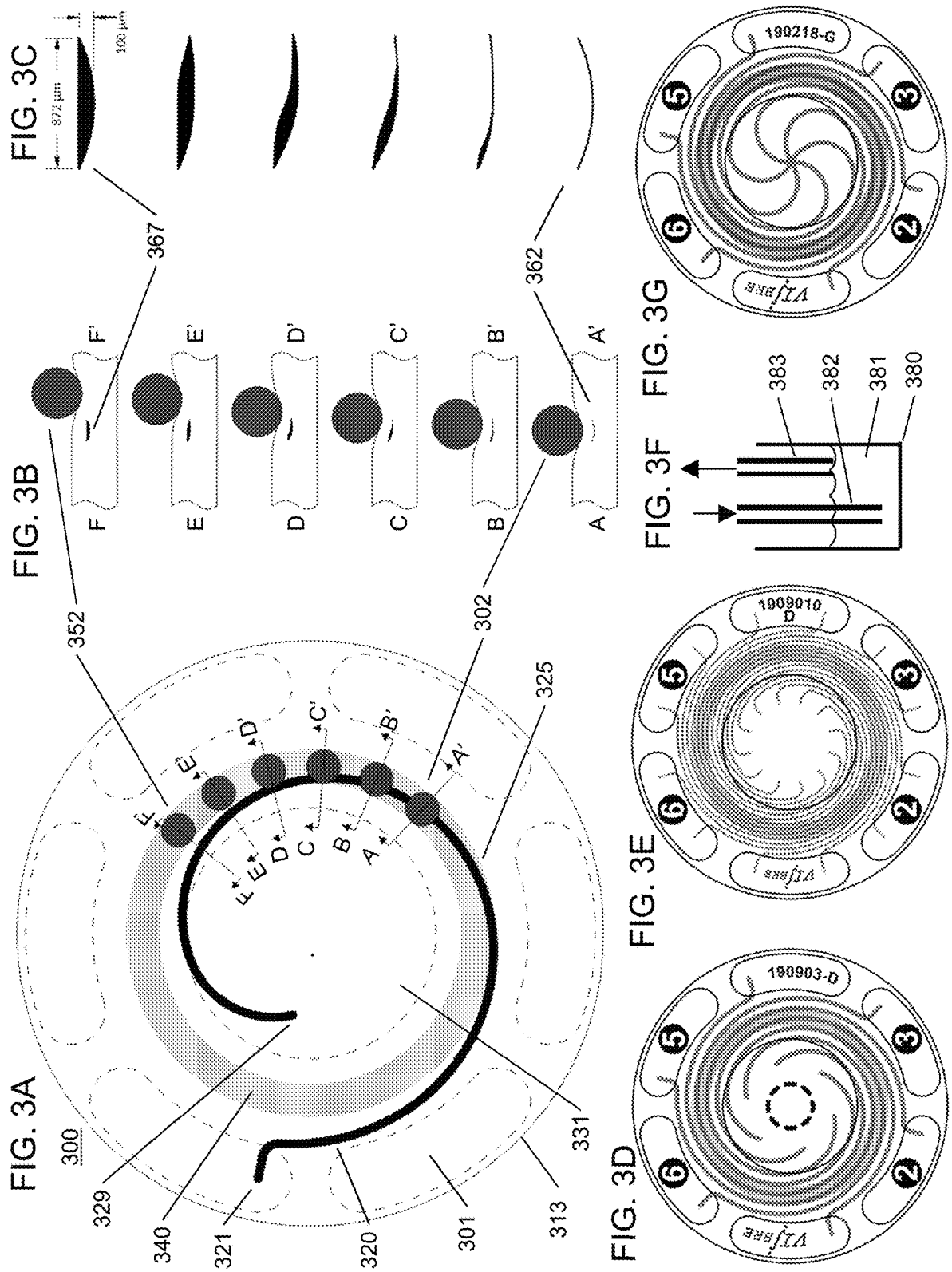

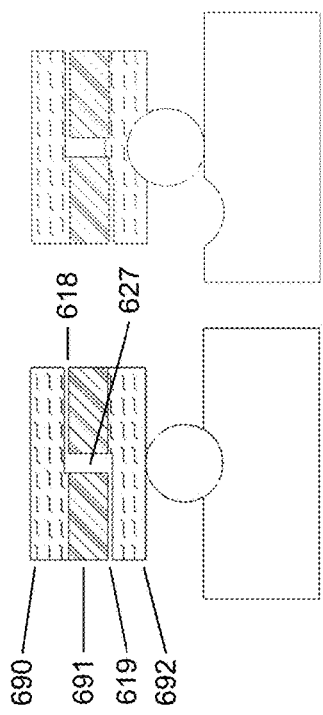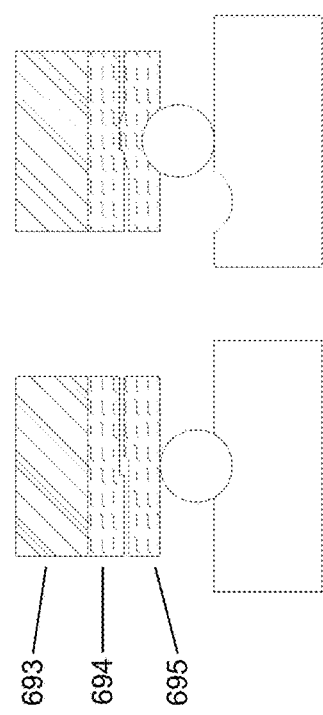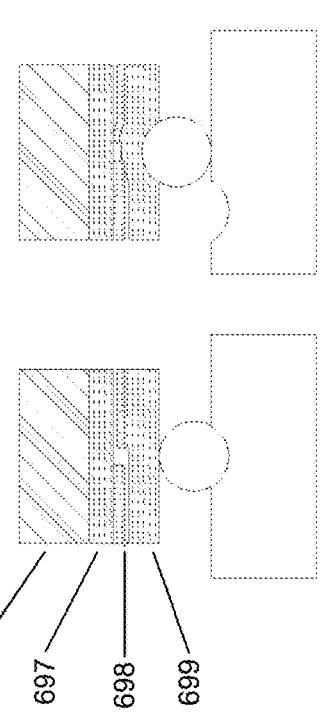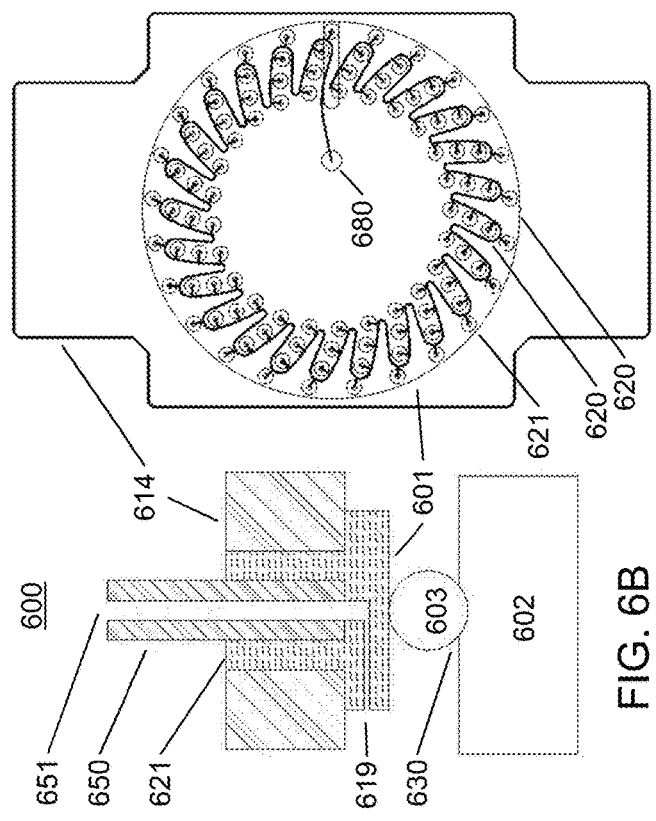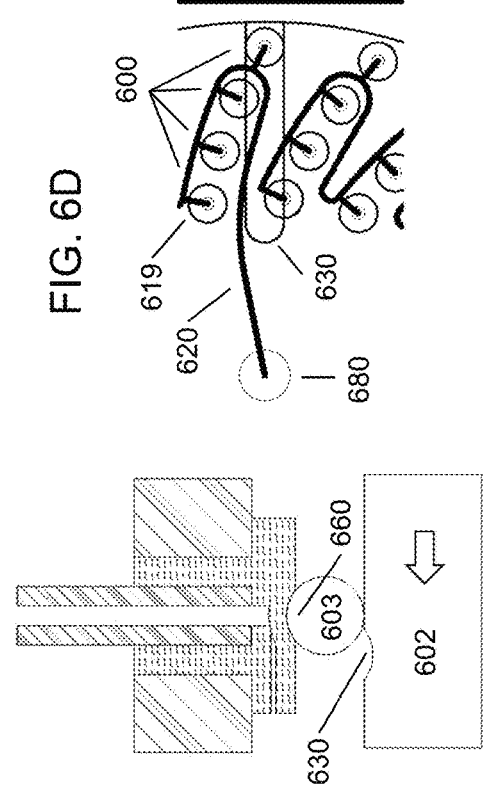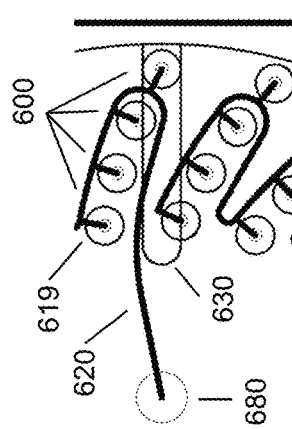

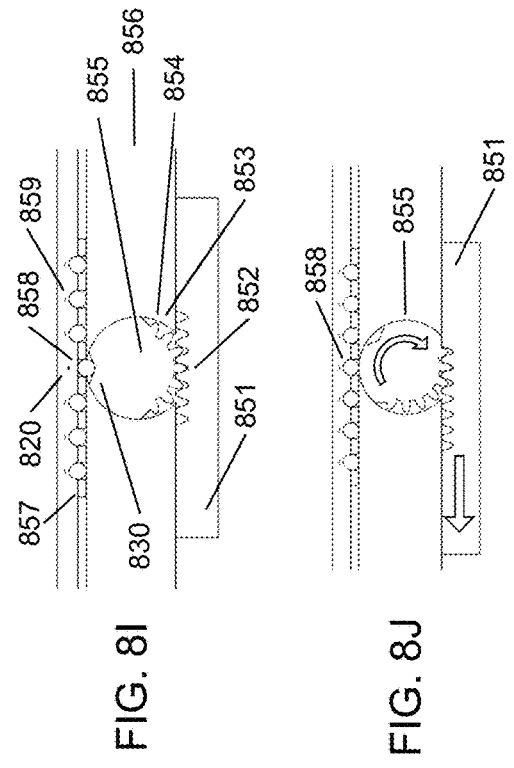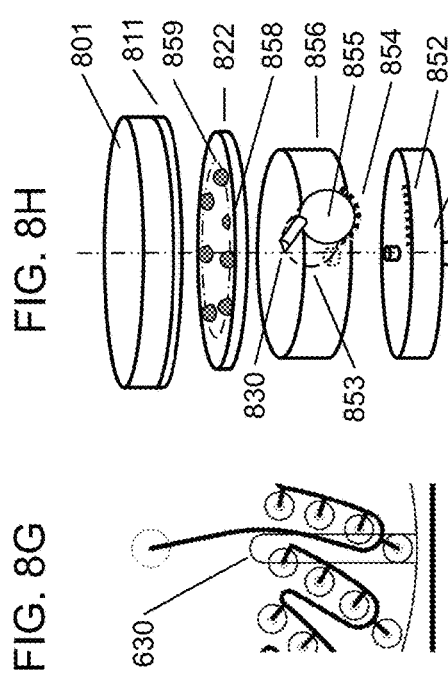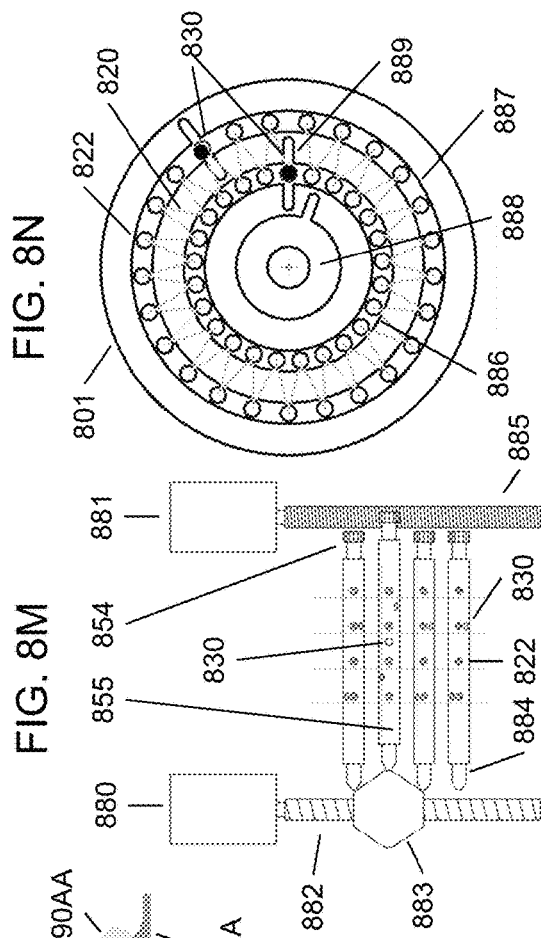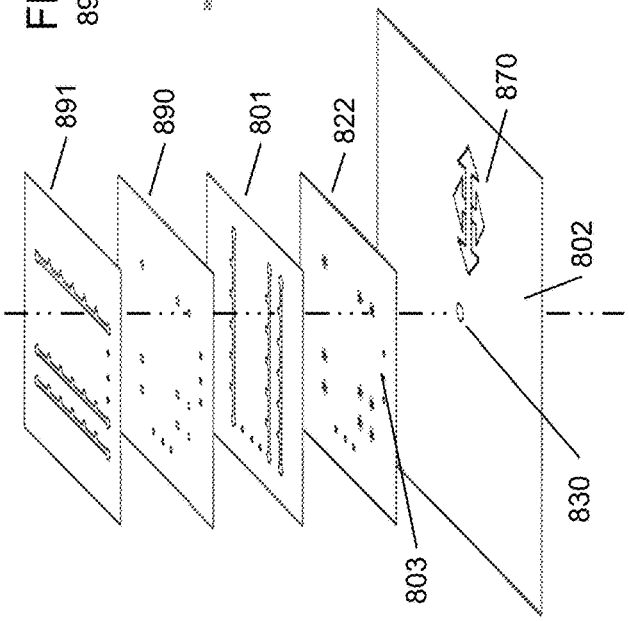

MICROFLUIDIC SYSTEMS, PUMPS, VALVES, FLUIDIC CHIPS THEREOF, AND APPLICATIONS OF SAME

CROSS-REFERENCE TO RELATED PATENT APPLICATIONS

This application is a continuation application of U.S. patent application Ser. No. 17/623,350, filed Dec. 28, 2021, now allowed, which is a U.S. national phase entry of PCT Patent Application Serial No. PCT/US2020/040061, filed Jun. 29, 2020, which claims priority to and the benefit of U.S. Provisional Patent Application Ser. No. 62/868,303, filed Jun. 28, 2019, and is also a continuation-in-part application of PCT Application Serial Nos. PCT/US2019/047190, PCT/US2019/047307 and PCT/US2019/047324, all filed Aug. 20, 2019. Each of the above-identified applications is incorporated herein by reference in its entirety.

STATEMENT AS TO RIGHTS UNDER FEDERALLY-SPONSORED RESEARCH

This invention was made with government support under Grant Nos. 5UG3TR002097-02, U01CA202229 and HHSN271201700044C awarded by the National Institutes of Health, Grant No. 83573601 awarded by the U.S. Environmental Protection Agency, Grant No. 2017-17081500003 awarded by the Intelligence Advanced Research Projects Activity, and Grant No. CBMXCEL-XL1-2-001 awarded by the Defense Threat Reduction Agency through Subcontract 468746 by Los Alamos National Laboratory (LANL). The government has certain rights in the invention.

FIELD OF THE INVENTION

The invention relates generally to fluidic systems, and more particularly to microfluidic systems, pumps and valves, fluidic chips thereof, and applications of the same.

BACKGROUND INFORMATION

Existing pumps and valves are used in controlling and sensing organs-on-chips. These pumps and valves are implemented in a fluidic cartridge that contains the mechanical, electrical, and microfluidic components necessary for operation thereof. However, further improvement and refinement of the pumps and valves may be required. Therefore, a heretofore unaddressed need exists in the art to address the aforementioned deficiencies and inadequacies.

SUMMARY OF THE INVENTION

One aspect of the present invention relates to a microfluidic system, which is used as a tilted-actuator pump, and includes: a support plate; a fluidic chip disposed on the support plate, wherein the fluidic chip has a fluidic network comprising at least one fluidic channel; an actuator having a plurality of compression structures configured to roll against the fluidic chip to control the fluidic channel to switch locally between an open state and a closed state, wherein each of the compression structures is a roller; and a motor shaft inserted in the actuator to drive the actuator to rotate relative to the fluidic chip; wherein the actuator and the motor shaft are disposed to tilt from an actuator-contact surface of the fluidic chip, such that the actuator rotates in a plane tilted by an angle with respect to the actuator-contact surface of the fluidic chip. In one embodiment, the motor shaft is perpendicular to the support plate, and the fluidic chip is a wedge-shaped fluidic chip, such that the actuator and the motor shaft are disposed to tilt from the actuator-contact surface of the wedge-shaped fluidic chip. Alternatively, in one embodiment, the motor shaft is tilted and is not perpendicular to the actuator-contact surface of the fluidic chip and the support plate, such that the actuator and the motor shaft are disposed to tilt from the actuator-contact surface of the fluidic chip that has parallel contacting and fluidic surfaces. Alternatively, in one embodiment, the motor shaft is perpendicular to the support plate, and a passive wedge structure is disposed between the fluidic chip and the support plate, such that the fluidic chip is disposed to tilt from the support plate, and the actuator and the motor shaft are disposed to tilt from the actuator-contact surface of the fluidic chip.

A further aspect of the present invention relates to a microfluidic system, which includes: a support plate; a fluidic chip disposed on the support plate, wherein the fluidic chip has a fluidic network comprising at least one fluidic channel; at least one compression structure, configured to compress or decompress the fluidic network within the fluidic chip; an actuator, controlling the compression structure at one or more compression or decompression sites; and a motor shaft inserted in the actuator, configured to rotate the actuator relative to the fluidic chip, wherein the actuator controls the compression structure at the compression or decompression site to compress or decompress the fluidic channel at a particular location when the actuator rotates or otherwise moves.

In one embodiment, the actuator is an actuator assembly including: a ball cup facing the fluidic chip, forming the receiving cavity between the ball cup and the fluidic chip, wherein the at least one compression structure comprises a plurality of balls disposed in the receiving cavity and configured to roll against the fluidic chip; a ball cage disposed between the balls; and a traction disc disposed between the ball cup and the balls, configured to generate a traction force to compress the balls to roll against the fluidic chip.

In one embodiment, the fluidic chip is a spiral pump chip including: a first surface facing and fixed to the support plate; and a circular zone disposed on a second surface facing the actuator assembly, wherein each compression structure of the actuator rolls against the circular zone; wherein each fluidic channel of the spiral pump chip is a spiral fluidic channel having an outer end outside the circular zone and an inner end within the circular zone, and each spiral fluidic channel partially aligns with the circular zone along a vertical direction, such that each compression structure rolls along the circular zone, compressing the portion of each spiral fluidic channel to pump a fluid inside the non-compressed segments of each spiral fluidic channel.

In one embodiment, the fluidic chip is a rotary peristaltic pump chip, each fluidic channel within the rotary peristaltic pump chip has a pumping channel interconnected with an output channel and an output bypass channel, and the at least one compression structure comprises a plurality of balls configured to roll against an outer surface of the pumping channel and to press a fluid in the pumping channel toward the output channel and the output bypass channel.

In one embodiment, the fluidic chip is an analytical valve chip, and the fluidic network within the analytical valve chip includes: a sensor output channel connected to a sensor; a waste output channel connected to a waste reservoir; one or more bioreactor input channels, each being connected to a bioreactor; and a plurality of rinse/calibration input channels; wherein the compression structure comprises a plurality of caged balls, and the actuator comprises a sliding actuating surface with actuating recesses that, depending upon actuator position, compress or release the balls against the sensor output channel, the waste output channel, and the rinse/calibration input channels to interconnect the bioreactor input channel and the rinse/calibration input channels with the sensor output channel and the waste output channel, wherein in a calibration mode, at least one of the bioreactor input channels is selected to be interconnected to the waste output channel, allowing an analyte from the corresponding bioreactor to be sent to the waste reservoir through the selected bioreactor input channel and the waste output channel, and the rinse/calibration input channels are successively interconnected to the sensor output channel to perform rinse and provide calibration media to the sensor; and in a measurement mode, one of the bioreactor input channels is selected to be interconnected to the waste output channel, allowing the analyte from the selected bioreactor to be sent to the sensor through the bioreactor input channel and the sensor output channel to perform an analytic measurement of the analyte by the sensor, and the other bioreactor input channels and one or more of the rinse/calibration input channels are interconnected to the waste output channel.

In one embodiment, the fluidic chip is a multi-port valve chip comprising a first port and a plurality of second ports, wherein the fluidic channel of the multi-port valve chip interconnects the first port with all of the second ports, the at least one compression structure comprises a plurality of caged balls and a recess corresponding to the caged balls, each of the caged balls is located corresponding to one of the second ports, and when the actuator rotates, only one of the caged balls is located in the recess to allow a corresponding second port to switch to an open state, and the other of the caged balls are not located in the recess such that the other corresponding second ports remain in a closed state.

In one embodiment, the multi-port valve chip is a random-access valve, and the actuator includes: a first actuator disk connected to the motor shaft, and having a tangential rack; and a second actuator disk having a partial pinion disposed at a circumferential side and mated with the tangential rack of the first actuator disk, wherein the recess is formed on the partial pinion; wherein when the tangential rack reaches and jams at an extreme end of the partial pinion, the first actuator disk drives the second actuator disk to rotate relative to the fluidic chip; and when the tangential rack does not reach the extreme end of the partial pinion, the first actuator disk drives the partial pinion to rotate relative to the second actuator disk.

In one embodiment, the fluidic chip is a direct-access valve chip having two caged-ball locations corresponding to each fluidic channel, the at least one compression structure comprises at least two balls corresponding to the two caged-ball locations, wherein each ball is configured to press the direct-access valve chip to switch a corresponding portion of each fluidic channel to a closed state, and the actuator is a lagging actuator including: an outer actuator, fixed to the motor shaft and having an outer groove corresponding to one of the two caged-ball locations; and an inner actuator, having a limiting pocket and having an inner groove corresponding to the other of the two caged-ball locations. Each of the inner groove and the outer groove, when aligned with the corresponding one of the two caged-ball locations, relieves the corresponding ball to switch the corresponding portion of each fluidic channel to an open (uncompressed) state. A limiting pin is fixed to the outer actuator and inserted in the limiting pocket of the inner actuator. The limiting pocket has an arc-length such that, when the lagging actuator rotates along a clockwise direction relative to the direct-access valve chip, the limiting pin reaches a clockwise extreme end of the limiting pocket, and the outer groove and the inner groove are unaligned, allowing at most one of the outer groove and the inner groove to align with the balls corresponding to one of the fluidic channels; and when the lagging actuator rotates along a counterclockwise direction relative to the direct-access valve chip, the limiting pin reaches a counterclockwise extreme end of the limiting pocket, and the outer groove and the inner groove are aligned, allowing both the outer groove and the inner groove to align with the balls corresponding to one of the fluidic channels.

In yet another aspect, a microfluidic system is provided, which is a random-access bistable valve, and includes: a support plate; a fluidic chip disposed on the support plate, wherein the fluidic chip has a common fluidic channel and a plurality of access channels; an elastomeric membrane disposed on the fluidic chip; a plurality of caged balls disposed on the elastomeric membrane, corresponding to and aligned with the access channels, and an actuator disposed on the elastomeric membrane and having a recess, wherein the actuator presses the caged balls against the elastomeric membrane to seal the access channels in a closed state; wherein a relative position of the recess is randomly movable relative to the fluidic chip, and when the recess moves to a position to align with one of the balls, the recess allows the one of the caged balls to release the elastomeric membrane and switch the corresponding access channel to an open state.

In one embodiment, the actuator includes: a central partial pinion connected to the motor shaft; and a rack pawl located in an actuator slot and mated with the central partial pinion, wherein the recess is formed on the rack pawl; wherein when the central partial pinion rotates clockwise, the rack pawl moves and allows the recess to align with one of the caged balls; and when the central partial pinion rotates counterclockwise, the rack pawl moves and retracts the recess, such that the recess does not align with any of the caged balls; and wherein when the central partial pinion rotates counterclockwise to an extreme position, the rack pawl moves to abut against an end of the actuator slot, and the central partial pinion drives the entire actuator to rotate relative to the fluidic chip.

In one embodiment, the actuator includes: a central pinion connected to the motor shaft; and a partial pinion mated with the central pinion, wherein the recess is formed on the partial pinion; wherein when the central pinion rotates, the central pinion drives the partial pinion to rotate relative to the fluidic chip, allowing the recess to move to the position to align with one of the caged balls or to retract and not to align with any of the balls; and wherein when the central pinion rotates to an extreme position of the partial pinion, the central pinion drives the entire actuator to rotate relative to the fluidic chip.

In certain embodiments, the microfluidic system further includes a bubble-tracking flow meter, which includes: two light-transmission detecting devices disposed on two locations of the fluidic channel of the fluidic chip, each of the two light-transmission detecting devices comprising: a light source disposed on a first side of the fluidic channel, configured to emit light; and a light detector disposed on a second, opposite side of the fluidic channel, configured to receive light emitted by the light source; wherein a bubble injected in the fluidic channel is configured to trigger each of two light-transmission detecting devices, such that a flow rate of the fluidic channel is determined by measuring the time difference between the threshold signals reported by two light-transmission detecting devices.

In certain embodiments, the microfluidic system further includes a gas exchange bioreactor, which includes a chamber located between and in communication with an input port and an output port, where a bioreactor perfusion media is configured to pass through the chamber; and a plurality of gas exchange channels surrounding the chamber, such that gas passing through the gas exchange channels is configured to diffuse through a material between the chamber and each gas exchange channel and to interact with a content of the chamber.

These and other aspects of the invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment.

FIGS. 1A-1C show a tilted rotor pump according to certain embodiments of the invention, where FIG. 1A shows a wedge-shaped fluidic chip, FIG. 1B shows a tilted actuator, and FIG. 1C shows an additional wedge.

FIGS. 2A and 2B show a rolling ball actuator assembly according to one embodiment of the present invention.

FIGS. 2C and 2D show a rolling ball actuator assembly according to another embodiment of the present invention.

FIGS. 2E and 2F show a microfluidic pump having the rolling ball actuator assembly of FIGS. 2A-2B.

FIGS. 3A-3G show a spiral pump according to certain embodiments of the invention.

FIGS. 6A-6G show a multi-port valve according to certain embodiments of the invention.

DETAILED DESCRIPTION OF THE INVENTION

Figure 5A:
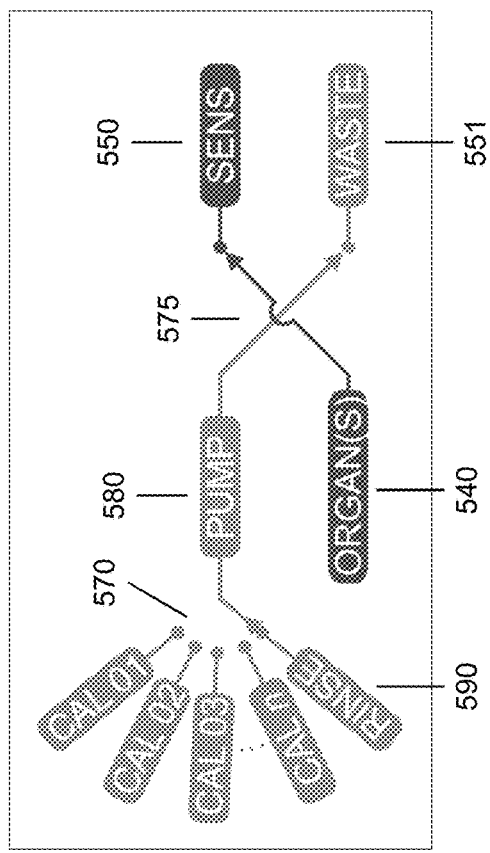
FIGS. 5A-5G show a multi-port, multi-throw analytical valve according to certain embodiments of the invention.

The invention will now be described more fully hereinafter with reference to the accompanying drawings, in which exemplary embodiments of the invention are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

One aspect of the present invention relates to a microfluidic system, which is used as a tilted-rotor or actuator rotary peristaltic pump. FIGS. 1A-1C show a tilted actuator pump according to certain embodiments of the invention. Specifically, FIG. 1A shows a substantially vertical motor shaft 101 inserted into a pump actuator 102 that moves the rollers 103 to compress a wedge-shaped fluidic chip 104 with contacting surface 110 and fluidic surface 120 with a wedge angle $\theta$ between them that is mounted upon a support plate 100, where $\theta \neq 0$. FIG. 1B indicates how the same varying force between the rollers and the contacted surface of the fluidic chip can be accomplished by tilted shaft 106 and the pump actuator 102, such that the actuator 102 and the rollers therein rotate in a plane that is tilted by angle $\theta$ with respect to the fluidic chip 105. FIG. 1C shows a substantially vertical motor shaft 101, but with the contacted surface of fluidic chip 105 separated from the support plate 100 by a passive wedge 107 with angle $\theta$. In all cases, the wedges or motor tilt reduces the flow transients associated with abrupt engagement and disengagement of a roller with the underlying channel.

One aspect of the present invention relates to a microfluidic system, which utilizes a rolling ball actuator. FIGS. 2A-2D show a rolling ball actuator assembly according to certain embodiments of the invention, and FIGS. 2E and 2F show a microfluidic pump having the rolling ball actuator assembly. As shown in FIGS. 2A and 2B, the rolling ball actuator assembly 200 includes a sprocket 201, which functions as a ball cage, to maintain the separation of balls 202. In certain embodiments, the actuator assembly 200 may include at least one ball 202, and the sprocket 201 may be necessary when multiple balls 202 are provided. The balls 202 roll against an elastomeric O-ring 203 (see FIG. 2B), which functions as a traction disc that provides the traction force to allow the balls 202 to roll against the fluidic chip 213 (see FIGS. 2E and 2F). Between the balls 202, the fluidic chip 213 is not compressed so that the fluidic channel can capture the fluid being pumped. The round or square cross-section O-ring 203 is positioned in a recess groove in ball cup 204 in such a way to avoid contact with the rotating sprocket ball cage 201. The radial position of the balls is determined by a ball cup 204 and the sprocket 201. A set screw in a threaded hole 205 attaches the actuator assembly 200 to the motor shaft 215 (see FIGS. 2E and 2F). FIGS. 2C and 2D show an actuator assembly according to another embodiment, with an elastomeric washer 207 as a flat elastomeric traction disk that lies flat on the bottom of the ball cup 204 with a spacer/washer 208 above in the center to create a vertical separation between the traction disk 207 and the sprocket 201. FIG. 2D shows the traction disk 207 being penetrated by a central shoulder 209 that is part of the ball cup 204 that elevates the actuator 201 and prevents it from rubbing against the disk 207, thereby avoiding damage to the traction washer caused by rubbing against the sprocket. As shown in FIGS. 2E and 2F, a through-plate fluidic chip 213 with pumping channels (not shown) is supported by the fluidic support plate 214. The motor shaft 215 rotates the actuator assembly 200 in contact with the fluidic chip 213, thus forming a microfluidic pump.

FIGS. 3A-3G show a spiral pump according to certain embodiments of the invention. Specifically, FIG. 3A shows a through-plate elastomeric fluidic chip as a single-channel spiral peristaltic pump 300, which may be used as the fluidic chip 213 in FIGS. 2E and 2F. The through-plate elastomeric fluidic chip 313 has six outer protrusions 301 and a single inner protrusion 331 that align and hold the chip 313 in a support plate (214 in FIGS. 2E and 2F). These protrusions 301 and 331 are optional and are used for convenience here to combine the functions of mechanical positioning and tubing ports and do not affect the operation or performance of the described spiral pump. The microfluidic channel 320 has an outer end 321 to a tubing port within one of the outer protrusions 301, and an inner end 329 that connects to a tubing port in the inner protrusion 331. A multiple-ball rolling ball actuator (such as the actuator assembly 200 in FIGS. 2E and 2F) compresses a circular zone 340 that crosses a segment of the spiral fluidic channel 320 at point 325. As the ball actuator continues to move, in this example counterclockwise, the channel 320 is fully collapsed by the compression zone, and the dots 302 represent the sequential positions of one of the many balls in the actuator, as shown at the location "A" to "F" of maximum channel compression at sequential instants of time, as indicated by the six section lines in FIG. 3A and the sectional views in FIG. 3B. At location A, the channel 320 is fully compressed, as shown by 362 in FIGS. 3B and 3C, and blocks the flow of fluid. The point moves as the actuator rotates. In this example, the pumping of the channel 320 is from the outer end 321 to the inner end 329 (through points A to F), and at the point F, the ball being tracked no longer compresses the channel 320 so that it relaxes to its native dimensions (367, FIG. 3C). As the balls travel along their circular path, the fluid is trapped between the travelling compression zones and moves along the channels, because beneath each ball in the compression zone the cross-sectional area of the channel 320 will be less than the relaxed value given by the native dimensions of the channel 367 (FIG. 3C). As the balls move out of the compression zone, the trapped fluid will be gradually released towards the channel outlet 329. If the dots A-F were to represent separate balls rather than a single ball being tracked with time, each of the compression zones A-to-B, B-to-C, C-to-D, D-to-E, and E-to-F acts as a travelling fluidic capacitor that absorbs pressure and volume changes, while the incomplete compression zones between the dots (C, D, E) act as resistors in a series of resistor-capacitor low-pass filters that move along the spiral channel and attenuate severely the fluctuations normally associated with a peristaltic pump. A similar filtering effect occurs to minimize reflected input fluctuations as the channel enters the compression zone between 321 and AA'. The exact spiral shape of the spiral channel 320, its size relative to the actuator, and the diameter and spacing between the balls in the rolling ball actuator will determine the low-pass filter characteristics of the spiral pump. The gradual restoration of the compressed channel shape depicted in FIGS. 3B and 3C as the actuator balls roll away from the channel contributes to the gradual, smooth release of the fluid trapped between the ball compression zones. While in this example the actuator is rotating counterclockwise to pump from the outer end 321 to the inner end 329, the device may also function in reverse, pumping from 329 to 321 with clockwise actuator rotation. In certain embodiments, the parameters that describe the curvature of the spiral can be adjusted to minimize output pulsations preferably for one direction of motion. A different parameterization could optimize the performance for the opposite direction of rotation.

Given that only a small fraction of the area of the fluidic chip 313 is occupied by the spiral channels and only one outer protrusion 301 contains a tubing port 321, in certain embodiments, it is possible to add additional channels to the fluidic chip 313, as shown in FIGS. 3D (6 channels) and 3E (12 channels), with the corresponding 6 and 12 tubing ports respectively on the inner protrusion 331. Further, given that all the channels in either FIG. 3D or 3E will produce identical flow rates, within manufacturing tolerances, half of the channels could be used to deliver fluid to one side of a sealed barrier bioreactor, for example a neurovascular unit (NVU) on a chip, and the other half used to deliver fluid to the other side of the barrier. Thus, the six-channel chip in FIG. 3D could use a single motor and actuator to perfuse both sides of three two-chamber NVUs. Alternatively, the matched pumping channels could ensure that the same amount of fluid that was delivered to the input of a bioreactor was removed from the other, to minimize pressurized flow across the barrier, in the form of a push-pull pump pair, and the 12-channel pump in FIG. 3E could do push-pull perfusion of both sides of three NVU bioreactors.

While a constant level of fluid in an open reservoir could be maintained by pumping in the exact amount of fluid as is pumped out, in practice this is difficult to accomplish, as pump properties or local conditions vary over time. The inevitable mismatches could lead to a reservoir being emptied or overfilled. In certain embodiments, the channels in FIGS. 3D and 3E may alternate in their cross-sectional area; for example, using two different channel widths and/or depths, the pumping rate of the larger channels would be proportionally larger than the smaller channels, which allows a multichannel spiral pump to maintain a particular level of fluid 381 in multiple open bioreactors 380, as shown in FIG. 3F, since the level of fluid in the bioreactor would be set by the height of the withdrawal tube 383 that would be designed to pump fluid faster than the fluid delivered by input tube 382. Because the withdrawal channel pumps faster than the delivery channel, if the fluid level is higher than the bottom of the withdrawal tube 383, the level will drop because more fluid is being pumped out. If the fluid level is lower than the bottom of the withdrawal tube 383, the withdrawal tube 383 will pump air and the fluid level will rise, thereby regulating the fluid level.

FIG. 3G shows a six-channel spiral pump that has a common central port. In this configuration, a clockwise rotation will deliver equal amounts of fluid to each of the outer ports, serving as a splitter that does not suffer from the inevitable imbalances that can occur with a passive splitter. Rotation in the counterclockwise direction will draw fluid from each of the outer ports and collect it at the inner one, for example to collect at identical rates effluent from multiple bioreactors and deliver it to a common reservoir or analytical instrument. In certain embodiments, not all channels/ports present must be used, which allows an application of this fluidic chip such that, with the actuator rotating counterclockwise, the collective flow rate may be selected by connecting any number of outer ports to supply tubing while blocking or recirculating the unused ports.

In the embodiment as described above, the spiral pump has the protrusions, and the balls are used as compression structures. In certain embodiments, the spiral pump does not require the protrusions. In certain embodiments, the balls may be replaced by rollers or alternative compression structures. Other embodiments of the spiral pump can utilize certain shapes of rollers or rollers in combination with force-distributing ridges rather than balls to provide the periodic moving pressure zones that result in progressively lesser degrees of channel compression in the regions of spiral channel closest to the center of the spiral that is end of the spiral that is typically designated as the fluid output port.

Figure 4:
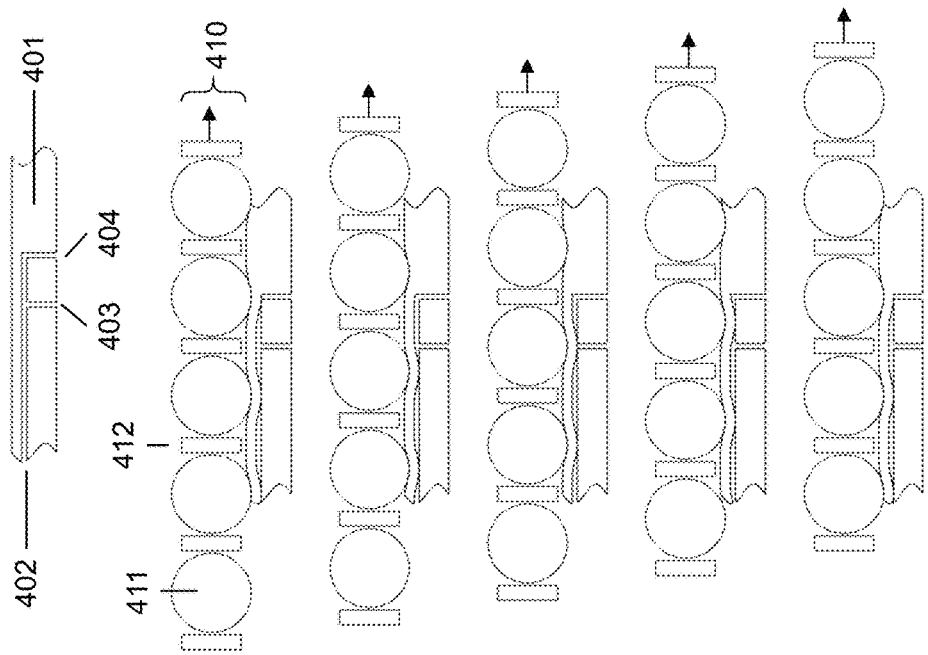
FIG. 4 shows a rotary peristaltic pump according to certain embodiments of the invention.

FIG. 4 shows a rotary peristaltic pump according to certain embodiments of the invention, which provides an alternative means to reduce peristaltic pump fluctuations. As shown in FIG. 4, the microfluidic chip 401 has a pumping channel 402, an output channel 404, and an output bypass channel 403 that connects 401 to the bioreactor or collection reservoir (not shown). A rotating rolling actuator 410, shown with a circumferential view, contains multiple balls 411 and a common cage 412. An external force applied to the balls 411 by either the cage 412 or to an upper moving traction disc (see FIGS. 2A-2D) causes the balls 411 and the cage 412 to move rightward, as shown by the arrow. As the balls 411 compress the pumping channel, the balls 411 create compression zones that capture fluid and, as the actuator moves rightward, the trapped fluid does as well. The use of two connection channels 403 and 404 prevent the fluid from being trapped and pressurized as the balls 411 reach the end of the channel 402 and fluid is expelled. The combination of the two connection channels 403 and 404 ensures that the delivery of fluid by the pump is never interrupted, which commonly happens with peristaltic pumps during the roll off transition. A corresponding structure could exist on the input of the pump to avoid transient halting of the input flow or when the pump is operated in the suction mode.

Figure 5B:
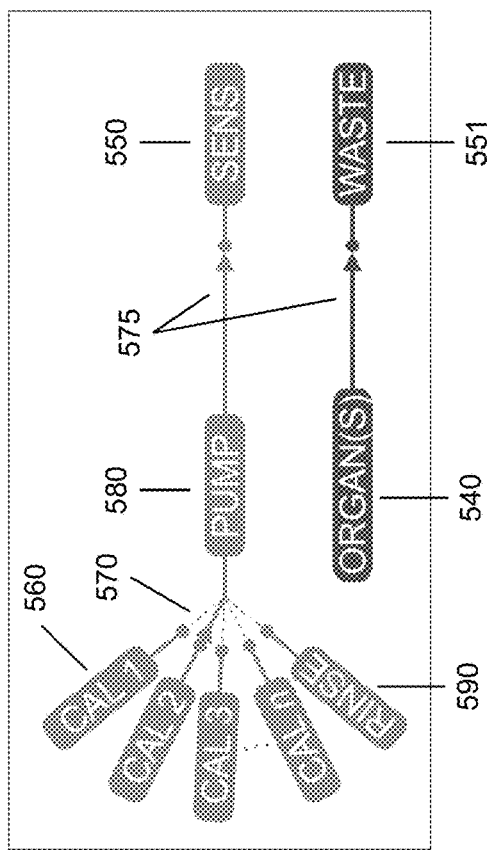

FIGS. 5A-5G show a multi-port, multi-throw analytical valve according to certain embodiments of the invention. Specifically, FIGS. 5A and 5B show the operation and utility of the multi-port, multi-throw analytical valve to control the connection of the output flow of one or more perfused microbioreactors or organs 540 to a metabolic or other sensor 550 or a waste reservoir 551. During the operation of the analytical valve in either a measurement mode (FIG. 5A) or a calibration mode (FIG. 5B), the output flow of the bioreactor(s) is never blocked. As shown in FIG. 5A, in the measurement mode, the output of the organ(s) 540 passes through the sensor 550 by the position of the valve 575, and the common fluidic channels of the valve 570 and the pump 580 are rinsed by having the pump 580 withdraw rinse media from reservoir 590 and direct it towards the waste reservoir 551. Other calibration solutions 570 could be pumped to the waste reservoir 551 as well. Further, as shown in FIG. 5B, in order to calibrate the metabolic sensor 550, which is prone to drift, the valve 570 is switched to the calibration mode by selecting calibration media (CAL 2 shown) from one of several calibration media reservoirs 560 to perform the calibration operation, the calibration media is delivered to the sensor 550 by the pump 580, and the output(s) of the organ(s) 540 is directed towards waste 551 by the action of valve 575. In this design, the organ(s) may be perfused by gravity, pneumatic pressure, or a pump (not shown) such that the organ is always continuously perfused.

Figure 5E:
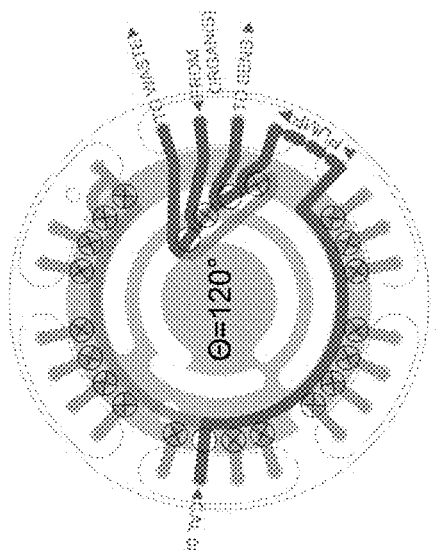
Figure 5G:
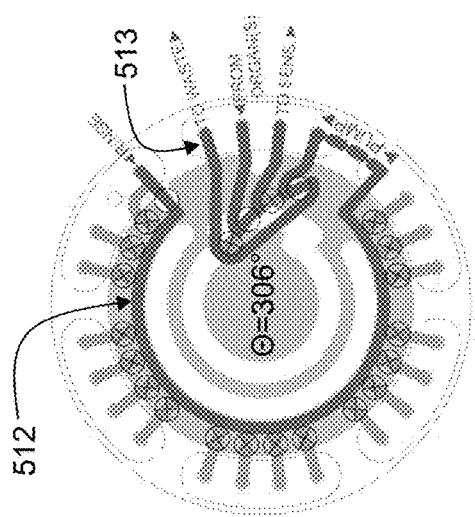
Figure 5D:
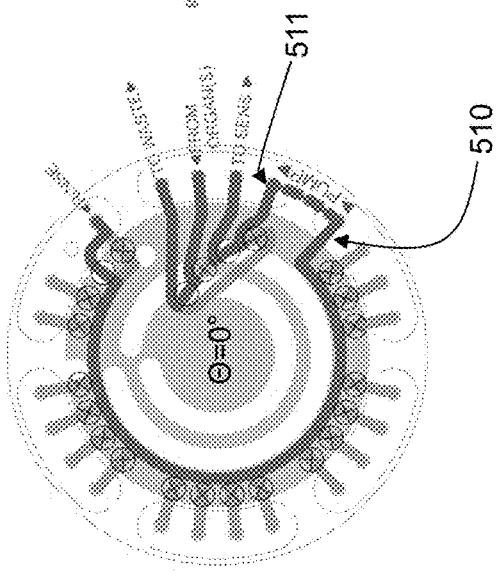
Figure 5F:
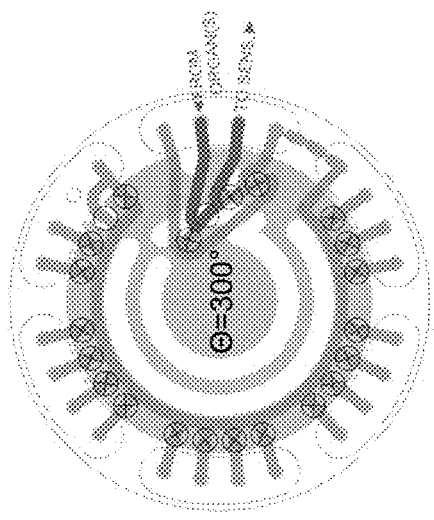
Figure 5C:
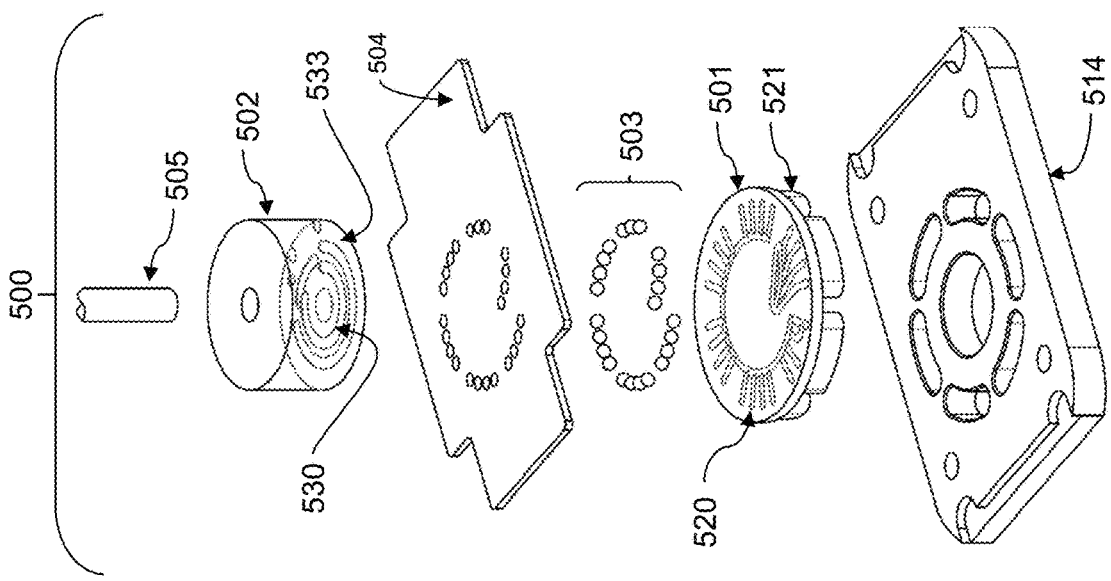

FIG. 5C shows a single microfluidic analytical valve 500 that can implement the various modes described in FIGS. 5A and 5B. As shown in FIG. 5C, the analytical valve 500 includes a fluidic chip 501 with protrusions 521 that serve as tubing ports and anchor the fluidic chip 501 to the support plate 514, and microfluidic channels in the fluidic network 520 are sealed within the fluidic chip 501. The actuator 502, with ball-actuating grooves 530 in an actuating surface 533, is driven by a motor shaft 505, and includes actuating elements 503, a ball cage 504, and an off-board pump (not shown). The actuator 502 rotates to change the state of the valve and the caged actuating elements (in this embodiment balls) slide against the actuator. For example, in a first state as shown in FIG. 5D (where an actuator angle Θ=0°), the analytical valve 500 collects an analyte from the bioreactor (not shown) through a bioreactor input channel, and sends it to a waste reservoir (not shown) through a waste output channel, while also collecting a rinse solution and directing it first through an internal fluidic channel 510, the off-board pump (not shown), through another internal fluidic channel 511, and finally to the sensor (not shown) through a sensor output channel. In a second state as shown in FIG. 5E (where the actuator angle Θ=120°), a calibration solution is selected (e.g., CAL 08) through a corresponding calibration input channel and directed to the sensor through the sensor output channel, while the bioreactor input channel is interconnected to the waste output channel to send the analyte from the bioreactor to waste. In a third state (where the actuator angle Θ=252-285°, not shown), the analyte remains directed from the bioreactor to waste, while all other conduits are closed and idle. In a fourth state as shown in FIG. 5F (where the actuator angle Θ=300°), the bioreactor input channel is switched and interconnected to the sensor output channel to direct the analyte from the bioreactor to the sensor, while all other conduits are idle. In a fifth state as shown in FIG. 5G (where the actuator angle Θ=306°), a rinse solution is directed through a rinse input channel to pass the length of channels 512, 513 and sent to waste, while the analyte remains are collected from the bioreactor and sent to the sensor. In the embodiments as shown in FIGS. 5A-5G, the analytical valve 500 is designed such that fluid being pumped into the fluidic chip 501 from the bioreactor has an outlet at all times (either sent to the sensor, to waste, or to both), as not to cause a dead-end scenario that might rupture the fluidic chip 501 or interrupt perfusion of a sensitive organ chip. In certain embodiments, the number of ports or channels that can be serviced as shown in FIGS. 5C-5G is determined by the available circumference of the through-plate fluidic chip 501 and the underlying tubing-port protrusions 521 that anchor the fluidic chip 501 to the support plate 514, and the minimum spacing between individual channels in the fluidic network 520. As shown in FIG. 5C, a typical valve has 1 inlet/outlet port and 25 outlet/inlet ports, depending upon the chosen flow direction. In certain embodiments, different embodiments of the fluidic network 520 could use some of the 25 ports to service two or more independent bioreactors whose output is either sent to a sensor or waste.

FIGS. 6A-6G show a multi-port valve according to certain embodiments of the invention. Specifically, the multi-port valve 600 is built upon the architecture of the rotary planar valve assembly 500 in FIG. 5C, except with a vastly higher port density. The multi-port valve 600 increases the number of ports by having the tubing port directly beneath each valve actuator, as shown in FIGS. 6A and 6B, where a through-chip fluidic valve unit 600 has a tubing 650 with a bore 651 seated in the tubing port of a circular through-plate fluidic chip 601 with multiple protrusions 621 inserted into fluidic support plate 614. In the open state as shown in FIG. 6A, the ball 603 is seated in the recess 630 in the actuator 602, and the access channel 619 in the fluidic chip is open and connected to tubing bore 651. As shown in FIG. 6B, the actuator 602 is rotated to the left so that the ball 603 is lifted out of the recess 630 to compress, collapse, and seal the access channel 621, switching it to the closed state. The resistance to shear force between the tubing 650 and the protrusion 621, and the insertion of the protrusion 621 into the support plate 614 together support the compressive force delivered by the ball 603 to create a compression zone and seal 660 immediately beneath the tubing port.

FIG. 6C shows a multi-port valve according to one embodiment, where the fluidic chip 601 has 100 valve units 600 with the protrusions 621 all penetrating corresponding holes in the support plate 614. As shown in FIG. 6C, a central port (i.e., the first port) 680 is connected to a single common channel 620 that is everywhere located outside of the compression zone 660 in FIG. 6B that supplies (or collects) media from each of the valve units (i.e., the second ports), such that the first port 680 is interconnected with all of the second ports. The design does not require any cross-overs of the fluidic channels, so all fluidic channels are in a single layer. FIG. 6D shows an enlarged view of the relation between the access channels 619 and the common channel 620, where the length of each access channel 620 is kept as short as possible to extend beyond the compression zone 660 in FIG. 6B to minimize the dead volume and fluid retention associated with the uncompressed portion of each sealed channel. FIG. 6D also shows a radial actuator recess groove 630 that can span the radial distance occupied by the four-deep pattern of valve units 600 that are angled to allow the radial actuator groove 630 to access one valve unit at a time, depending on the angle to which the actuator is rotated. In other embodiments, the valve in FIG. 6D with M ports could be divided into N identical sections, each with separate input ports 680 and common channels 620, and an actuator 602 with N recesses, to create an M×N multiple-port/multiple-throw valve.

FIGS. 6E-6G show the valve unit according to different embodiments, where the fluid is conveyed to the valve region not vertically by a tube 650 (see FIG. 6A) but horizontally by a channel 618 that is connected to a vertical via 627 that is in turn connected to access channel 619. In each of FIGS. 6E-6G, the left panels show the open state similar to FIG. 6A, and the right panels show the closed state similar to FIG. 6B. As shown in FIG. 6E, the upper fluidic layer 690 with the channel 618 is either rigid or elastomeric, the middle via layer 691 is rigid and supports the compressive force, and the lower layer 692 with channel 619 is elastomeric. The valve in FIG. 6F has only two fluidic layers 694 and 695 backed by a rigid support plate 693, and does not have a via layer and hence cannot provide fluidic cross-overs because the vias are created by any intersections of channels on opposing surfaces of the two layers 694 and 695. As shown in FIG. 6G, a rigid support layer 696 supports the compressive force delivered to the rigid or elastomeric upper layer 697 without channels, a via layer 698 with a channel to the right, and a lower elastomeric layer 699 with a channel to the left, thus supporting fluidic cross-overs because the channels are in the upper surfaces of elastomeric layers 698 and 699, and the middle layer 698 also provides the vias. In each embodiment, all layers are bonded to prevent leaks. The high density of ball actuators in FIGS. 6C-6D can also be used to create a pump, since the use of three balls on a single straight channel operated in a specific sequence creates a pump. In certain embodiments, it is possible to create a rotating pump actuator that can provide this sequence with a properly curved groove.

Figure 7A:
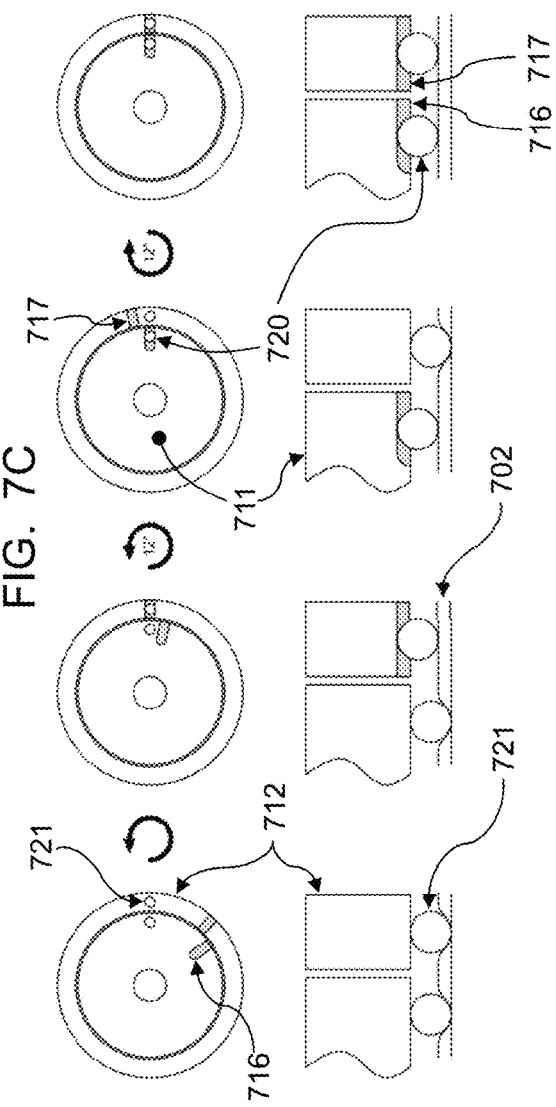
FIGS. 7A-7C show a lagging-actuator direct-access valve according to certain embodiments of the invention.
Figure 7C:
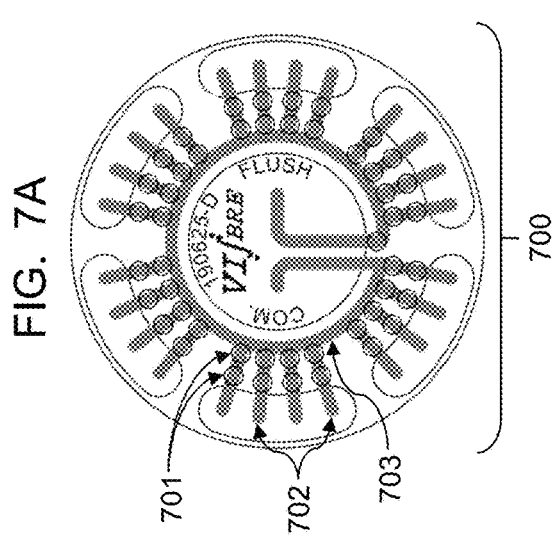
Figure 7B:
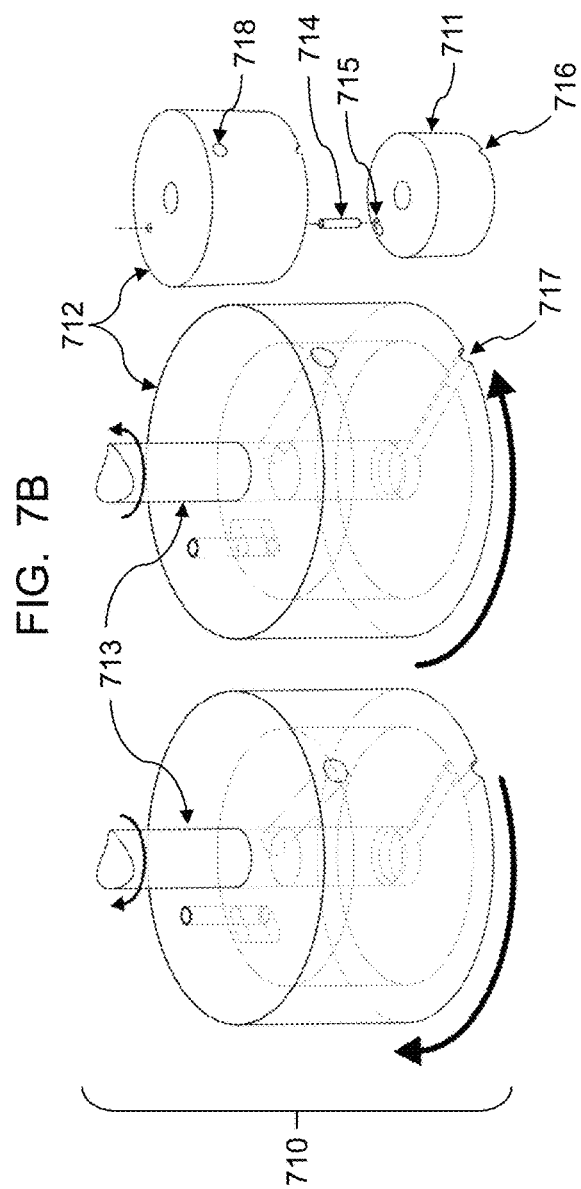

FIGS. 7A-7C show a lagging-actuator direct-access valve according to certain embodiments of the invention. Specifically, the rotary valves described above are all serial access valves, with the ports being addressed one after another as the actuator is rotated. Using FIG. 6C as an example, suppose that the valve port in a first position is currently open, and it is necessary to close the port in the first position and open another port in an eighth position. Thus, the actuator would be rotated from the first position to the eighth position, transiently opening and closing all intermediate ports. As long as the fluidic channels were not pressurized and the actuator was rotated quickly, there would be minimal fluid displaced from channels in the second to seventh positions. Accordingly, a lagging-actuator direct-access valve has the ability to go from one valve position to a distant one without having to transiently open and close each intermediate channel. As shown in FIG. 7A, a valve chip 700 has multiple actuating element (ball) locations 701 operating on each of the input/output fluidic channels 702 connected to a common fluidic channel 703. Each channel 702 is normally pinched closed by two balls 720 and 721 (see FIG. 7C). A given input/output channel 702 pinched by at least one ball 720 and 721 is closed. In order to open the given input/output channel 702, the compressive force applied to both corresponding balls 720 and 721 must be relieved concurrently. In other words, if either or both balls 720 and 721 are not actuated from their normally-closed position, the channel 702 remains closed.

FIG. 7B shows a lagging-actuator assembly 710, including an inner (driven) actuator 711 and an outer (driving) actuator 712, as coaxially aligned on a motor shaft 713. The outer actuator 712 is locked to the motor shaft 713 by a set screw (not shown) in the screw hole 718. A limiting pin 714 is affixed to the outer actuator 712, and its motion is constrained to within the bounds of a limiting pocket 715 on the inner actuator 711. When the outer actuator 712 is rotated clockwise, the limiting pin 714 is driven to the clockwise extreme end of the limiting pocket 715, and the reverse is also true. The arc-length of limiting pocket 715 establishes an intended backlash or "lag" between the outer actuator 712 and the inner actuator 711. As the outer actuator 712 rotates clockwise as viewed from above, the limiting pin 714 contacts clockwise extreme end of limiting pocket 715, and the outer actuator 712 and the inner actuator 711 begin to rotate as a whole, with an outer groove 717 on the outer actuator 712 and an inner groove 716 on the inner actuator 711 unaligned. With grooves 716 and 717 unaligned, all input/output channels 702 see compression from at least one ball 720 and 721 at all times. Beginning in this state and immediately following reversal in rotational direction of the outer actuator 712, the inner actuator 711 remains stationary (by friction and/or presence of actuator element 720 within the inner groove 716) until the limiting pin 714 contacts the other end of the limiting pocket 715, and the inner actuator 711 and the outer actuator 712 rotate as a whole with the grooves 716 and 717 axially aligned. In this case, with actuator grooves 716, 717 axially aligned, both pinch points established by the balls 720 and 721 are relieved concurrently, and target channel 702 opens to flow.

FIG. 7C shows a lagging-actuator assembly 710 as seen by the fluidic chip 700 as well as corresponding cross-sectional views, in multiple steps (from left to right) required for opening target channel 702 to flow. As the grooves 716, 717 approach a target zone, the inner ball 720 and the outer ball 721 remain pressed into the fluidic chip, thereby blocking flow. When the lagging-actuator assembly 710 rotates from its previous position, no channel has both balls released concurrently. In the second step, by rotating counterclockwise (as seen by the fluidic chip 700), the outer groove 717 reaches and aligns with the outer ball 721. In the third step, after further counterclockwise rotation, the outer groove 717 has rotated past alignment with the outer ball 721, while the inner groove 716 reaches and aligns with the inner ball 720. In the rightmost and last step, rotation reverses until the outer groove 717 also aligns with the outer ball 721 while the inner (driven) actuator 711 remains stationary. Both balls have now retracted to open the target channel 702.

In a different application, the actuator assembly 710 may spin along a same direction continuously (rather than moving to a designated channel and stopping) with the grooves unaligned, causing the balls 720, 721 to sequentially relax momentarily. As the pinched channels 702 momentarily relax, the fluid previously displaced by respective balls 720, 721 returns to fill the void. As the actuator assembly 710 continues to rotate, the balls 720, 721 once again pinch the channel 702, and the corresponding fluid is again displaced. The result is a pulsation of fluid through the conduit within and/or connected to the channel 702, and this pulsation could be used at the end of the conduit to mix or agitate a reservoir of liquid in which it is submerged. Since no channels are relieved of both pinch points concurrently in this application, there is no net flow through channels 702. In yet another application, it is also possible to provide the sequence required for unidirectional pumping by employing concentric rings that have a small "lag" offset. By making the lag offset operate in both directions, the sequence will be the same on the fluidic no matter which direction the motor is turning. This could be useful when coupling other mechanical components that are direction sensitive and could allow different modes of operation while always pumping fluid in the same direction.

Figure 8C:
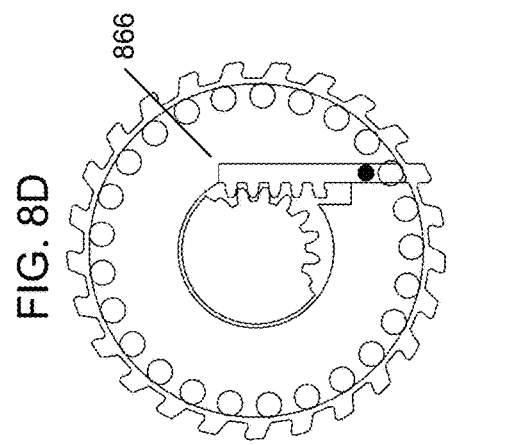
FIGS. 8A-8N show a random-access bistable valve according to certain embodiments of the invention.
Figure 8D:
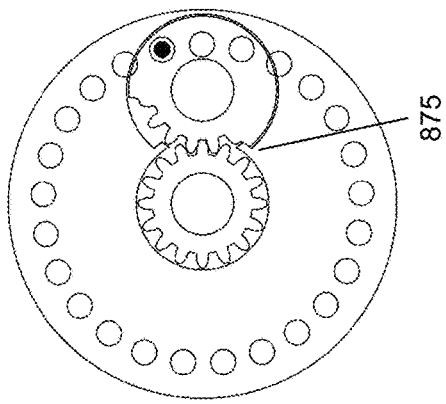

FIGS. 8A-8M show a random-access bistable valve according to certain embodiments of the invention, which provides random access to a valve that is bistable (each port is either open or closed, independent of whether the actuator is energized or not) and does not require the serial opening and closing of intermediate channels as previously discussed. In certain embodiments, the random-access bistable valve uses an actuator with two spatial degrees of freedom to provide random access to each port. As shown in FIG. 8A, a rigid or elastomeric fluidic chip 801 has one common channel 820 and three access channels 819, each with their own tubing ports 831-834 from the bottom. The channels are sealed by an elastomeric membrane 811 that is bonded to the fluidic chip 801. Three actuator balls 803 are captured by a ball cage 822 and are pressed into the membrane 811 by the actuator 802 with a recess 830. As shown, the leftmost ball 803 is released and the channel below it is open, whereas the right two balls are compressed into the membrane 811, thereby sealing those two channels. An X-Y actuator device 870 can move the recess 830 along a trajectory 871 that will allow the recess to open the rightmost valve while leaving the middle valve unchanged. The actuation device 870 in FIG. 8A may require two independent motors. In another embodiment, the mechanism in FIG. 8B allows a single motor to change the radial position of an actuating recess depending upon the direction of rotation of the actuator. Specifically, FIG. 8B shows a two-part actuator having an upper disk 840 and a lower disk 844 coupled by two pins 842 in one or more slots 843, such that rotation in one direction would place the actuating recess at one distance from the axis of rotation, but rotation in the opposite direction would result in the actuating recess being pushed to a different radius. The upper disk 840 is rotated by a motor drive shaft 841 to rotate the two pins 842, with one closer to the axis of the disk 840 than the other. The drive pins 842 engage the drive slot 843 in the lower disk 844. The shape of the drive slot 843 is designed to maximize the difference in the radial distance moved by the actuating recess 845 relative to the axis of the motor shaft 841 and the upper disk 840 when the disk is rotated first in one direction and then in another.

In certain embodiments, the radial control of the actuating recess can also be controlled by miniature gears enclosed within a rotating actuator. For example, as shown in FIGS. 8C and 8D, the motor (not shown) rotates a central partial pinion 861, which in turn drives the rack of a radial pawl 862. Rotation of central pinion 861 in the clockwise direction drives the pawl 862 and the actuating recess 863 outward, until the pawl 862 engages in the stationary slots 864 that define the angular location of the recess 863. In this case, the recess 863 is directly above one of the 25 available balls 865 in the cage layer above the channels within the valve fluidic chip. When the pawl 862 is rotated counter-clockwise (see FIG. 8D), the pawl 862 is retracted, and the recess 863 is no longer opening the valve at that angular location. Because the pawl 862 jams against the end of the actuator slot 866, the torque applied by the motor causes the entire actuator assembly to rotate counterclockwise, allowing the pawl 862 and the recess 863 to be moved to another angular location. Reversing the rotation to the clockwise direction drives the pawl outward and engages another stationary slot than the one as shown in FIG. 8C.

Figure 8E:
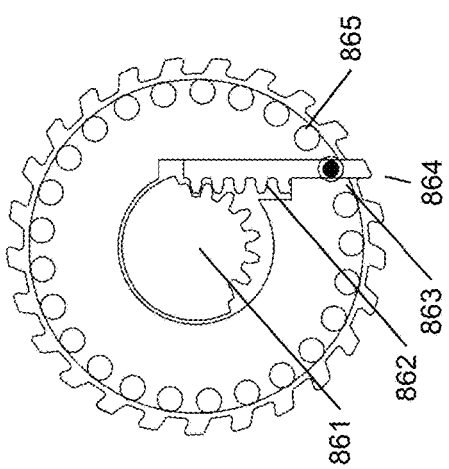
Figure 8F:
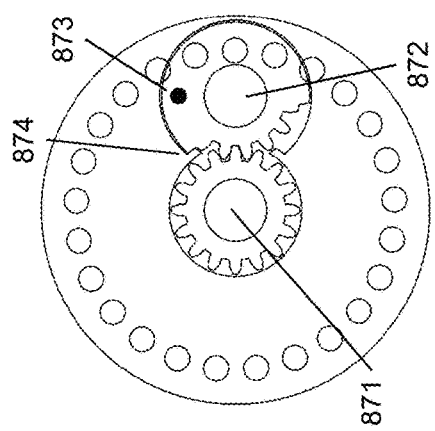
Figure 8A:
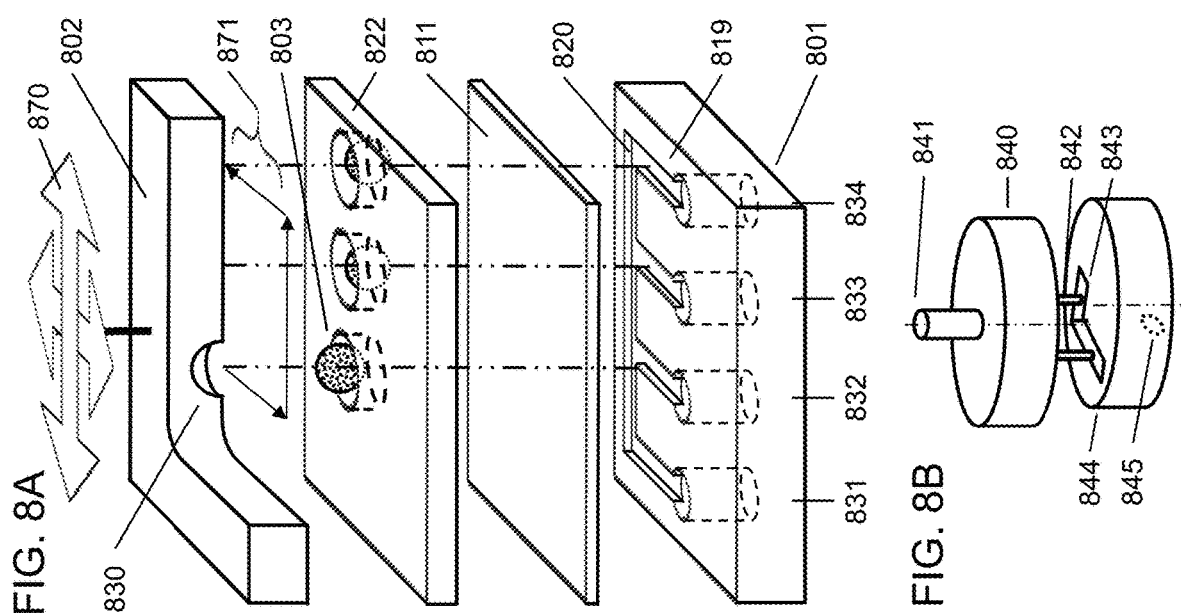
Figure 8B:
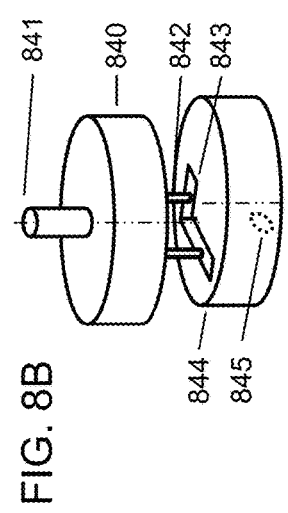

FIGS. 8E and 8F show another embodiment, which accomplishes the same radial control by having the actuator recess driven by a pinion gear with limited rotation. When the pinion reaches its stop, the motor torque rotates the entire actuator to the desired position. The gears would be hidden beneath a planar surface that allows the actuator to slide under the balls, with the balls dropping only when they are in the recess 873. The full central pinion 871 drives a partial pinion 872. When the central pinion 871 is driven in a clockwise direction, the actuation recess 873 is drawn in until the upper stop 874 is encountered, at which point the entire assembly would rotate clockwise to the desired valve position. As shown in FIG. 8F, the partial pinion 872 is rotated in the counterclockwise position, the recess 873 is driven out to engage with the desired actuating ball, and the lower stop 875 prevents the recess from being moved further out. Various combinations of clockwise and counterclockwise rotation of the central drive pinion thereby allow any desired valve to be actuated without engaging any intermediate ones.

In other embodiments, the random-access valve with geared detent control can be applied to other valves, such as the 100-port rotary planar valve in FIGS. 6C and 6D. FIG. 8G partially shows a valve of FIG. 6D with the actuator groove 630. This valve can be made into a random-access valve if it is possible to remove the groove when it is traversing balls whose opening is not desired. As shown in FIGS. 8H-8J, the mechanism converts the planar pinon/rack/stop approach of FIGS. 8E and 8F into a radial, cylindrical valve actuator that rotates in a similar directional manner, except in a vertical plane to drive a horizontal, radial cylinder that exposes or hides actuator groove 830. As shown in FIG. 8H, the lower actuator disk 851 is driven by a motor shaft 850 to rotate teeth of a tangential rack 852. These teeth engage with teeth of a partial pinion 854 in the actuator cylinder 855 in an upper actuator disk 856. A stationary ball cage 822 has a ball 858 resting in the actuator groove 830 so that the corresponding valve in the fluidic chip 801 is open (see FIG. 8I). The adjacent balls 859 are not in the groove 830, and thus are elevated in the ball cage 822 and compress membrane 811 to seal the corresponding channels controlled by the elevated balls 859. FIG. 8I shows how the cylindrical actuator 855 is captured in the radial and horizontal cylindrical hole 853. As shown in FIG. 8J, the lower actuator disk has been rotated to the left, causing the cylindrical actuator 855 to rotate clockwise, such that ball 858 is no longer in the recess, and the corresponding channel is closed. In certain embodiments, other mechanical configurations can be used to displace or hide the actuating recess or recesses. In certain embodiments, the valves could be actuated by linear rather than rotational motion of the activating recess or recesses relative to the activation sites.

In certain embodiments, the valve shown conceptually in FIG. 8A can be generalized into a "crossbar" valve that can connect any channel in one layer with any channel in a second layer. As shown in FIG. 8K, a planar actuator 802 contains an actuating recess 830 that can be moved in two orthogonal directions by an actuating device 870. The ball cage and the balls 822 are between the actuator and the first fluidic layer 801. A via layer 890 separates the first fluidic layer 801 from the second fluidic layer 891. If the spacing between the channels and the balls in the cage is sufficient, the actuator recess can be moved from any location to any other location without actuating any valve between these two positions. This system could readily create a 100×100 ribbon-fluidic crossbar valve formed at the overlapping intersection of two 100-channel ribbon fluidics 801 and 891. With adequate spacing between the channels in the ribbon fluidics 801 and 891, it would also be possible to use a diagonal line or other array of multiple actuating recesses 830 in planar actuator 802 to create a two-dimensional Moiré pattern such that there is a unique X-Y location of 802 such that a particular one of the many recesses 830 would align with one of the many via valves created by the array of vias in the via layer 890. In another embodiment, the use of multiple recesses 830 in actuator 802 could provide particular combinations of open and closed valves in a fluidic network. FIG. 8L shows the details of the protrusions that allow any multi-port via valve to be closed without blocking all downstream channels, including the overlap of the protrusion at the first valve position in the lower channel layer 801 (801A) with the protrusion at the first valve position in the upper channel layer 891 (891A), and the via that connects the two (890AA). Alternatively, a 100×100 crossbar valve could be implemented by having the 100 inputs 621 of the multi-port valve in FIG. 6C serve as the input to the 100×100 crossbar valve, with the output common port 680 being connected to the central input common port 680 of a second multi-port valve, whose 100 outputs 621 thereby address a different set of 100 fluidic lines, and this valve would also require two independent motors to specify the input and the output that would be connected to the common line connecting the two common ports 680.

In another embodiment, a sliding roller actuator system as shown in FIG. 8M can use the cylindrical actuator concept of FIG. 8H to implement the X-Y control of a crossbar valve without the need to rely on traversing a single or multiple fixed actuator recesses 830 across the area of the valve. As shown in FIG. 8M, a cam motor 880 with a lead screw 882 drives the cam 883 to the position to apply pressure to the end 884 of a horizontally spring-loaded cylindrical actuator 855. The rightward displacement of the cylindrical actuator 855 engages the pinion 854 on the threads of the horizontal axis control lead screw 885. Activation of the motor 881 can then control the angular position of the cylindrical actuator 855, allowing rotation without allowing any of the multiple actuating recesses 830 to engage any one of the via valves 822 in that horizontal row of the via valve array. Once the angular position of 855 has been selected to engage one and only one via valve, the cam 884 is moved away and the cylinder 855 returns to its original position to open the designated via valve. There is independent control of each horizontal valve set, as controlled by a single actuator 855, and independent control of the vertical set of cylindrical actuators, allowing more than one valve to be open at a time.

In yet another embodiment, a concept of the lagging actuator as discussed above can also be used to create a single-motor, 25×25-port crossbar valve, as shown in FIG. 8N. A valve chip 801 contains two concentric circular arrays of 25 via valves 822, all connected by a long common channel 820 that alternates between the inner and outer arrays, in a continuous series. Inner and outer actuator rings 886 and 887 each contain a single actuating recess 830 (black circle). The central motorized actuator 888 has a single protrusion that can cause the inner ring to rotate either clockwise or counterclockwise by engaging with the actuator protrusions 889 on the central actuator 888 and the rings 886 and 887. A sequence of sequential clockwise and counterclockwise rotations of the central actuator 888 can cause the two actuator recesses 830 to be positioned over the selected inner and outer via valves. The use of multiple actuating rings could enable the lagging-actuator direct access of FIG. 7.

In each of the valves as described above, the compression structure is shown as a plurality of caged balls that are pressed into or released from a fluidic channel by an actuating surface with recesses. In other embodiments, the same functions could be performed using an actuator that engages either caged cylinders or other shapes, or fixed cantilevers or levers.

Figure 9A:
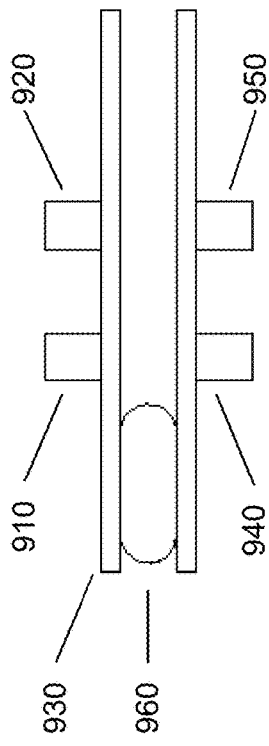
FIGS. 9A-9D show a bubble-tracking flow meter according to certain embodiments of the invention.
Figure 9B:
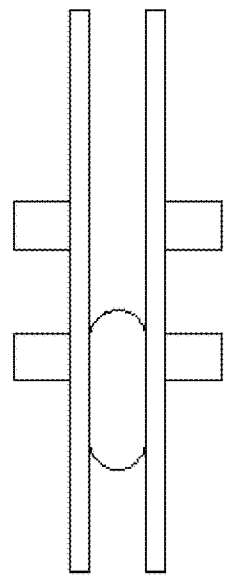
Figure 9C:
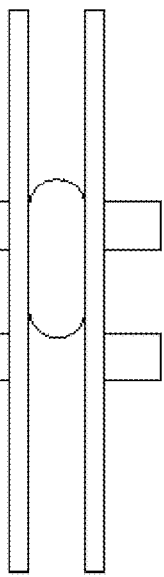
Figure 9D:
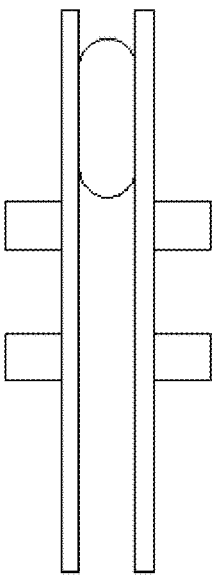

FIGS. 9A-9D show a bubble-tracking flow meter according to certain embodiments of the invention. The bubble-tracking flow meter can be realized using the pumps and valves in any of the embodiments and is not limited to those described above. As shown in FIG. 9A, the flow meter includes two light-transmission detecting devices separated by a known fixed distance, formed by light sources 910 and 920 and corresponding light detectors 940 and 950 located on the opposite sides of a fluidic channel or tube 930 to detect the presence or absence of a bubble in the channel or tube. A pump and valve (not shown) inject a bubble 960 that moves at a particular velocity along the channel between the two light-transmission detecting devices (FIGS. 9B-9D), where the leading or trailing edge of the bubble is used to trigger the detector circuitry (not shown) to determine the time it took for the injected bubble to traverse the distance between the detectors. The pump can reverse direction, return the bubble to its starting position, and send it across again at a different flow rate to calibrate the pump, or withdraw the bubble. In another embodiment, ultrasound could be used to detect the bubble.

Figure 10:
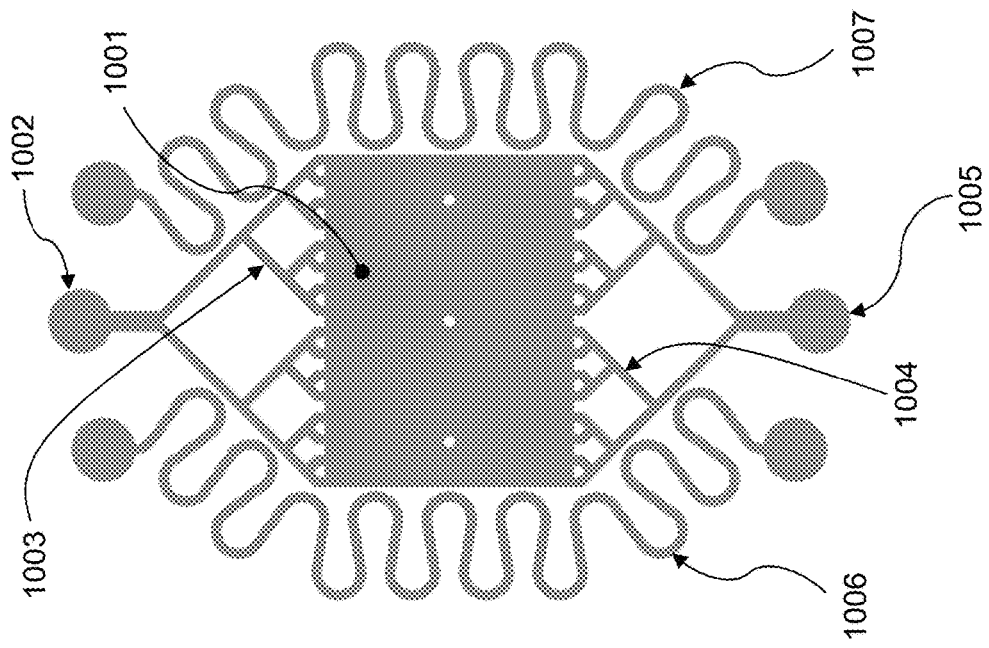
FIG. 10 shows a gas exchange bioreactor according to certain embodiments of the invention.

FIG. 10 shows a bioreactor with gas delivery/exchange capabilities according to certain embodiments of the invention. As shown in FIG. 10, the layout of the bioreactor chamber 1001 is formed and perfused through an input port 1002, a splitter network 1003, a collector network 1004, and an output port 1005. In this embodiment, two gas exchange channels 1006 and 1007 flank the bioreactor chamber 1001, the splitter network 1003, and the collector network 1004. In this instance the gas exchange channels 1006, 1007 have a serpentine shape to increase the surface through which gases, fluids containing certain concentrations of gasses, or gasses with certain moisture levels flowing through channels 1006 and 1007 interact with the material from which the construct is made. The gas diffusing through said material will, in turn, interact with the bioreactor contents of the bioreactor chamber 1001. In this embodiment, a gas concentration gradient may be established by sending different gases, or different concentrations of the same gas, through the two channels 1006 and 1007. Alternatively, the gas composition in the channels 1006 and 1007 may be identical.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A microfluidic system, being a tilted-actuator pump, and comprising:
    a support plate;
    a fluidic chip disposed on the support plate, wherein the fluidic chip has a fluidic network comprising at least one fluidic channel;
    an actuator having a plurality of compression structures configured to roll against the fluidic chip to control the fluidic channel to switch between an open state and a closed state, wherein each of the compression structures is a roller; and
    a motor shaft inserted in the actuator to drive the actuator to rotate relative to the fluidic chip;
    wherein the actuator and the motor shaft are disposed to tilt from an actuator-contact surface of the fluidic chip, such that the actuator rotates in a plane tilted by an angle with respect to the actuator-contact surface of the fluidic chip.

2. The microfluidic system of claim 1, wherein:
    the motor shaft is perpendicular to the support plate, and the fluidic chip is a wedge-shaped fluidic chip, such that the actuator and the motor shaft are disposed to tilt from the actuator-contact surface of the wedge-shaped fluidic chip; or
    the motor shaft is tilted and is not perpendicular to the actuator-contact surface of the fluidic chip and the support plate, such that the actuator and the motor shaft are disposed to tilt from the actuator-contact surface of the fluidic chip; or
    the motor shaft is perpendicular to the support plate, and a passive wedge structure is disposed between the fluidic chip and the support plate, such that the fluidic chip is disposed to tilt from the support plate, and the actuator and the motor shaft are disposed to tilt from the actuator-contact surface of the fluidic chip.

3. The microfluidic system of claim 1, wherein the fluidic chip is a spiral pump chip comprising:
    a first surface facing and fixed to the support plate; and
    a circular zone disposed on a second surface facing the actuator assembly, wherein each compression structure of the actuator rolls against the circular zone;
    wherein each fluidic channel of the spiral pump chip is a spiral fluidic channel having an outer end outside the circular zone and an inner end within the circular zone, and each spiral fluidic channel partially aligns with the circular zone along a vertical direction, such that each compression structure rolls along the circular zone, compressing the portion of each spiral fluidic channel to pump a fluid inside each spiral fluidic channel.

4. The microfluidic system of claim 1, further comprising a bubble-tracking flow meter, comprising:
    two light-transmission detecting devices disposed on two locations of the fluidic channel of the fluidic chip, each of the two light-transmission detecting devices comprising:
        a light source disposed on a first side of the fluidic channel, configured to emit light; and
        a light detector disposed on a second, opposite side of the fluidic channel, configured to receive light emitted by the light source;
    wherein a bubble injected in the fluidic channel is configured to trigger each of two light-transmission detecting devices, such that a flow rate of the fluidic channel is determined by measuring a triggering time difference between the two light-transmission detecting devices.

5. The microfluidic system of claim 1, further comprising a gas exchange bioreactor, comprising:
    a chamber located between and in communication with an input port and an output port, wherein a bioreactor perfusion media is configured to pass through the chamber; and
    a plurality of gas exchange channels surrounding the chamber, such that gas passing through the gas exchange channels is configured to diffuse through a material between the chamber and each gas exchange channel and to interact with a content of the chamber.

6. A microfluidic system, comprising:
    a support plate;
    a fluidic chip disposed on the support plate, wherein the fluidic chip has a fluidic network comprising at least one fluidic channel;
    at least one compression structure, configured to compress or decompress the fluidic network within the fluidic chip;
    an actuator, controlling the compression structure at a compression site; and
    a motor shaft inserted in the actuator, configured to rotate the actuator relative to the fluidic chip, wherein the actuator controls the compression structure at the compression site to compress or decompress the fluidic channel at a particular location when the actuator rotates or moves,
    wherein the actuator is an actuator assembly comprising:
        a ball cup facing the fluidic chip, forming the receiving cavity between the ball cup and the fluidic chip, wherein the at least one compression structure comprises a plurality of balls disposed in the receiving cavity and configured to roll against the fluidic chip;
        a ball cage disposed between the balls; and
        a traction disc disposed between the ball cup and the balls, configured to generate a traction force to compress the balls to roll against the fluidic chip.

7. The microfluidic system of claim 6, wherein the fluidic chip is a rotary peristaltic pump chip, each fluidic channel within the rotary peristaltic pump chip has a pumping channel interconnected with an output channel and an output bypass channel, and the at least one compression structure comprises a plurality of balls configured to roll against an outer surface of the pumping channel and to press a fluid in the pumping channel toward the output channel and the output bypass channel.

8. The microfluidic system of claim 6, further comprising a gas exchange bioreactor, comprising:
    a chamber located between and in communication with an input port and an output port, wherein a bioreactor perfusion media is configured to pass through the chamber; and a plurality of gas exchange channels surrounding the chamber, such that gas passing through the gas exchange channels is configured to diffuse through a material between the chamber and each gas exchange channel and to interact with a content of the chamber.

9. A microfluidic system, comprising:
a support plate;
a fluidic chip disposed on the support plate, wherein the fluidic chip has a fluidic network comprising at least one fluidic channel;
at least one compression structure, configured to compress or decompress the fluidic network within the fluidic chip;
an actuator, controlling the compression structure at a compression site; and
a motor shaft inserted in the actuator, configured to rotate the actuator relative to the fluidic chip, wherein the actuator controls the compression structure at the compression site to compress or decompress the fluidic channel at a particular location when the actuator rotates or moves,
wherein the fluidic chip is a spiral pump chip comprising:
a first surface facing and fixed to the support plate; and
a circular zone disposed on a second surface facing the actuator assembly, wherein each compression structure of the actuator rolls against the circular zone;
wherein each fluidic channel of the spiral pump chip is a spiral fluidic channel having an outer end outside the circular zone and an inner end within the circular zone, and each spiral fluidic channel partially aligns with the circular zone along a vertical direction, such that each compression structure rolls along the circular zone, compressing the portion of each spiral fluidic channel to pump a fluid inside each spiral fluidic channel.

10. The microfluidic system of claim 9, wherein the actuator is an actuator assembly comprising:
a ball cup facing the fluidic chip, forming the receiving cavity between the ball cup and the fluidic chip, wherein the at least one compression structure comprises a plurality of balls disposed in the receiving cavity and configured to roll against the fluidic chip;
a ball cage disposed between the balls; and
a traction disc disposed between the ball cup and the balls, configured to generate a traction force to compress the balls to roll against the fluidic chip.

11. A microfluidic system, comprising:
a support plate;
a fluidic chip disposed on the support plate, wherein the fluidic chip has a fluidic network comprising at least one fluidic channel;
at least one compression structure, configured to compress or decompress the fluidic network within the fluidic chip;
an actuator, controlling the compression structure at a compression site; a motor shaft inserted in the actuator, configured to rotate the actuator relative to the fluidic chip, wherein the actuator controls the compression structure at the compression site to compress or decompress the fluidic channel at a particular location when the actuator rotates or moves; and
a bubble-tracking flow meter, comprising two light-transmission detecting devices disposed on two locations of the fluidic channel of the fluidic chip, each of the two light-transmission detecting devices comprising:
a light source disposed on a first side of the fluidic channel, configured to emit light; and
a light detector disposed on a second, opposite side of the fluidic channel, configured to receive light emitted by the light source;
wherein a bubble injected in the fluidic channel is configured to trigger each of two light-transmission detecting devices, such that a flow rate of the fluidic channel is determined by measuring a triggering time difference between the two light-transmission detecting devices.

* * * * *